US012739794B2

(12) United States Patent
Li et al.

(10) Patent No.: US 12,739,794 B2
(45) Date of Patent: Sep. 15, 2026

(54) RESOURCE SELECTION METHOD FOR SIDELINK IN VEHICLE-TO-EVERYTHING AND TERMINAL

(71) Applicant: DATANG GOHIGH INTELLIGENT AND CONNECTED TECHNOLOGY (CHONGQING) CO., LTD., Chongqing (CN)

(72) Inventors: Chenxin Li, Chongqing (CN); Rui Zhao, Chongqing (CN)

(73) Assignee: DATANG GOHIGH INTELLIGENT AND CONNECTED TECHNOLOGY (CHONGQING) CO., LTD., Chongqing (CN)

( * ) Notice: Subject to any disclaimer, the term of this patent is extended or adjusted under 35 U.S.C. 154(b) by 407 days.

(21) Appl. No.: 18/361,659

(22) Filed: Jul. 28, 2023

(65) Prior Publication Data

US 2023/0388975 A1 Nov. 30, 2023

Related U.S. Application Data

(63) Continuation of application No. PCT/CN2022/076647, filed on Feb. 17, 2022.

(30) Foreign Application Priority Data

Mar. 10, 2021 (CN) ......................... 202110262544.5

(51) Int. Cl.
*H04W 72/00* (2023.01)
*H04W 72/02* (2009.01)
(Continued)

(52) U.S. Cl.
CPC ........... *H04W 72/02* (2013.01); *H04W 72/25* (2023.01); *H04W 74/0808* (2013.01)

(58) Field of Classification Search
CPC . H04W 72/02; H04W 72/25; H04W 74/0808; H04W 52/0216; H04W 72/40;
(Continued)

(56) References Cited

U.S. PATENT DOCUMENTS

2018/0376357 A1 12/2018 Tavares et al.
2020/0112982 A1 4/2020 Li et al.
(Continued)

FOREIGN PATENT DOCUMENTS

CN 110740522 A 1/2020
CN 111148226 A 5/2020
(Continued)

OTHER PUBLICATIONS

Ericsson, Discussion and Decision on Reducing time-to-transmit for V2X, R1-1712661, 3GPP TSG RAN WG1 Meeting #90, dated Aug. 11, 2017.

(Continued)

*Primary Examiner* — Marcus Smith
*Assistant Examiner* — Shivakrishna Vallamdasu
(74) *Attorney, Agent, or Firm* — Westbridge IP LLC

(57) ABSTRACT

Disclosed are a resource selection method for sidelink in vehicle-to-everything and a terminal, which relate to the technical field of vehicle-to-everything communications. The resource selection method, applied to a terminal, includes: determining a resource selection occasion when a packet arrives; and selecting, at the resource selection occasion, a transmission resource for transmitting the packet.

18 Claims, 4 Drawing Sheets

(51) Int. Cl.
*H04W 72/25* (2023.01)
*H04W 74/0808* (2024.01)

(58) Field of Classification Search
CPC ... H04W 4/40; H04W 76/28; H04W 72/0446; Y02D 30/70
See application file for complete search history.

(56) References Cited

U.S. PATENT DOCUMENTS

| | | | | |
|---|---|---|---|---|
| 2020/0229171 | A1 | 7/2020 | Khoryaev et al. | |
| 2020/0374861 | A1 | 11/2020 | Shilov et al. | |
| 2023/0084593 | A1* | 3/2023 | Hoang | H04W 72/542 370/311 |
| 2023/0354386 | A1* | 11/2023 | Hui | H04W 72/20 |

FOREIGN PATENT DOCUMENTS

| | | | |
|---|---|---|---|
| CN | 111756487 | A | 10/2020 |
| CN | 112272397 | A | 1/2021 |
| EP | 3829231 | A1 | 6/2021 |
| WO | 2020021690 | A1 | 1/2020 |
| WO | 2020029197 | A1 | 2/2020 |

OTHER PUBLICATIONS

First Office Action issued in counterpart Chinese Patent Application No. 202110262544.5, dated Nov. 11, 2024.
Hu et al., C-V2X technology evolution and industry practice, Information and Communications Technology and Policy, 2020, No. 8, pp. 22-31, dated Aug. 15, 2020.
OPPO, Discussion and Decision on FL summary for AI 8.11.1.1—resource allocation for power saving, R1-2101412, 3GPP TSG RAN WG1 #104-e, dated Feb. 5, 2021.
International Search Report issued in corresponding PCT Application No. PCT/CN2022/076647, dated May 19, 2022.
NTT Docomo, Inc. Discussion on sidelink resource allocation for power saving, R1-2101630, 3GPP TSG RAN WG1#104, dated Feb. 5, 2021.
TCL Communication, Resource allocation for NR sidelink—Mode 2, R1-1912241, 3GPP TSG RAN WG1 Meeting #99, dated Nov. 22, 2019.
Vivo, Discussion on sidelink DRX, R1-2007690, 3GPP TSG-RAN WG1 Meeting #103-3, dated Nov. 13, 2020.
Office Action issued in counterpart European Patent Application No. 22766132.9, dated May 19, 2025.
CATT, Discussion on resource allocation mechanism for sidelink Mode 2 in NR V2X, 3GPP TSG RAN WG1 Meeting #98bis, dated Oct. 5, 2019.
European Search Report issued in counterpart European Patent Application No. EP 22766132.9, dated Apr. 8, 2024.
Moderator(OPPO), FL summary for AI 8.11.1.1—resource allocation for power saving, 3GPP TSG RAN WG1 #104-e, dated Feb. 5, 2021.
Notice of Reasons for Refusal issued in counterpart Japanese Patent Application No. JP 2023-544783, dated Jun. 4, 2024.
First Office Action issued in counterpart Korean Patent Application No. 10-2023-7025005, dated Aug. 30, 2025.
Intel Corporation, Resource Allocation Mode-2 for NR V2X Sidelink Communication, R1-1910650, 3GPP TSG RAN WG1 Meeting #98bis, dated Oct. 14, 2019.
Intel Corporation, Design of Resource Allocation Mode-2 for NR V2X Sidelink Communication, R1-1912205, 3GPP TSG RAN WG1 Meeting #99, dated Nov. 18, 2019.
LG Electronics, Discussion on resource allocation for power saving, R1-2100517, 3GPP TSG RAN WG1 Meeting #104-e, dated Jan. 25, 2021.
Qualcomm Incorporated, Latency reduction for packet transmission in eV2X, R2-1713404, 3GPP TSG RAN WG2 Meeting #100, dated Nov. 27, 2017.
Vivo, Discussion on mode 2 resource allocation mechanism, R1-1912022, 3GPP TSG RAN WG1 #99 meeting, dated Nov. 18, 2019.

* cited by examiner

Resource selection occasion is $n$+20 logical slots

Arrival time $n$ of a packet

P is 50 logical slots

M = 12 logical slots 20 logical slots

Re-evaluation $T_1$ Re-evaluation $T_2$ $T_{2'}$ $T_{1'}$

Time

Sensing duration triggered by other transmitting/receiving 20 logical slots

Resource selection occasion is $n$+20 logical slots
Arrival time $n$ of a packet
M = 12 logical slots
20 logical slots
Re-evaluation
Re-evaluation
$T_1$ $T_{1'}$ T $T_{2'}$
Sensing duration triggered by other transmitting/ receiving
20 logical slots
Time
Maximum preset duration of short-term contiguous sensing is 60 logical slots
FIG. 9
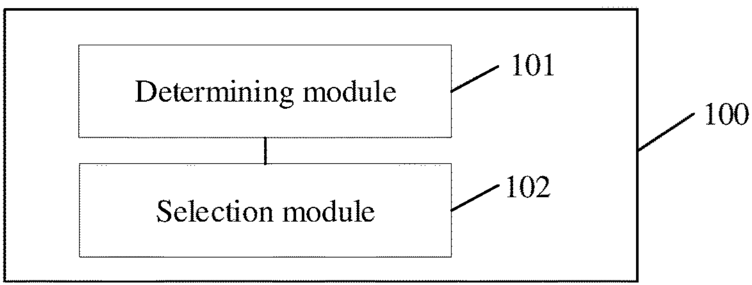
FIG. 10
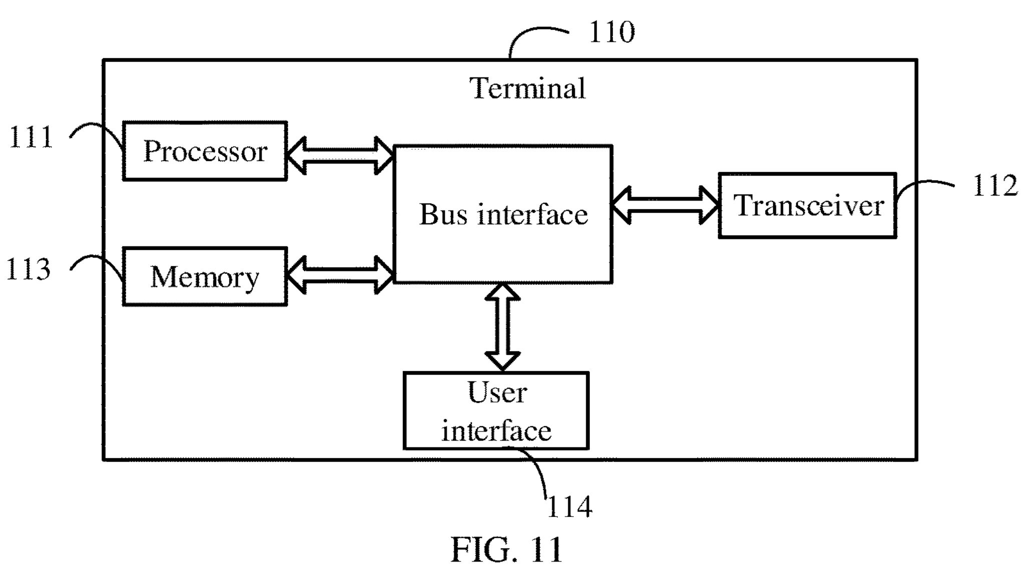
FIG. 11

RESOURCE SELECTION METHOD FOR SIDELINK IN VEHICLE-TO-EVERYTHING AND TERMINAL

CROSS-REFERENCE TO RELATED APPLICATIONS

This application is a continuation of International Application No. PCT/CN2022/076647, filed on Feb. 17, 2022, which claims priority to Chinese Patent Application No. 202110262544.5, filed on Mar. 10, 2021. The disclosures of the aforementioned applications are hereby incorporated by reference in their entireties.

TECHNICAL FIELD

The present disclosure relates to the technical field of vehicle-to-everything communications, and in particular, to a resource selection method for sidelink in vehicle-to-everything and a terminal.

BACKGROUND

Vehicle-to-everything (V2X) supports communication manners such as vehicle-to-vehicle (V2V), vehicle-to-infrastructure (V2I), vehicle-to-pedestrian (V2P), and vehicle-to-network (V2N). For a case in which a pedestrian cannot ensure continuously sufficient power supply of a V2X device (such as a pedestrian user equipment (P-UE), also referred to as a vulnerable road user (VRU)), or energy saving is required (such as endurance capability of a vehicle is insufficient or a road side device does not need to work continuously when there are few vehicles), a power saving mechanism of a UE needs to be considered. However, in a case that a power saving UE has a packet to be sent, when the UE performs autonomous resource selection for sidelink, and especially when a dynamic (non-periodic) packet (event triggering or the like) arrives, there is no resource selection mechanism in a related technology for this case, and communication reliability cannot be ensured.

SUMMARY

Embodiments of the present disclosure provide a resource selection method for sidelink in vehicle-to-everything and a terminal, to solve a problem that, for a V2X terminal in a power saving mechanism, when a dynamic packet arrives, there is no implementation mechanism for how the terminal performs resource selection in a related technology, and transmission reliability of the dynamic packet cannot be ensured.

To solve the foregoing technical problem, a resource selection method for sidelink is provided in an embodiment of the present disclosure, and the method is applied to a terminal and includes:

determining a resource selection occasion when a packet arrives; and selecting, at the resource selection occasion, a transmission resource for transmitting the packet.

Optionally, the determining a resource selection occasion includes:

obtaining a first target parameter corresponding to the packet; and if a value of the first target parameter is zero, determining that the resource selection occasion is an arrival time of the packet, where the first target parameter includes a parameter for minimum short-term contiguous sensing duration or a parameter for short-term contiguous sensing duration.

Optionally, the determining a resource selection occasion includes:

obtaining a first target parameter corresponding to the packet; and if the terminal performs contiguous sensing before an arrival time of the packet, and a duration of the contiguous sensing is greater than or equal to the first target parameter, determining that the resource selection occasion is equal to the arrival time of the packet, where the first target parameter includes a parameter for minimum short-term contiguous sensing duration or a parameter for short-term contiguous sensing duration.

Optionally, the determining a resource selection occasion includes:

determining a duration of short-term contiguous sensing required to be performed before resource selection; and determining the resource selection occasion based on the duration of short-term contiguous sensing required to be performed before resource selection.

Specifically, the determining a duration of short-term contiguous sensing required to be performed before resource selection includes:

determining, based on a second target parameter, the duration of short-term contiguous sensing required to be performed before resource selection, where the second target parameter includes at least one of the following:

a priority of the packet;

a delay of the packet;

reliability of the packet;

quality of service of the packet;

a minimum parameter for short-term contiguous sensing duration; and a parameter for short-term contiguous sensing duration.

Further, the determining the resource selection occasion based on the duration of short-term contiguous sensing required to be performed before resource selection includes:

if the terminal performs contiguous sensing before an arrival time of the packet, and a duration of the contiguous sensing is greater than or equal to the duration of short-term contiguous sensing required to be performed before resource selection, determining that the resource selection occasion is equal to the arrival time of the packet.

Optionally, the contiguous sensing ends before the arrival time of the packet, and a duration between the arrival time of the packet and a time at which sensing stops is less than or equal to K, where K is an integer greater than or equal to 0.

Further, the determining the resource selection occasion based on the duration of short-term contiguous sensing required to be performed before resource selection includes:

determining a first duration of contiguous sensing being performed by the terminal at an arrival time of the packet; and determining the resource selection occasion based on the first duration and the duration of short-term contiguous sensing required to be performed before resource selection.

Specifically, the determining the resource selection occasion based on the first duration and the duration of short-term contiguous sensing required to be performed before resource selection includes:

determining the resource selection occasion according to one of the following formulas:

$$n_{selection} = \begin{cases} n+(L-M), L-M>0 \\ n, L-M \le 0 \end{cases};$$

$$n_{selection} = \begin{cases} n+(L-M)+, L-M>0 \\ n+T_{proc,0}, L-M \le 0 \end{cases}; \text{and}$$

$$n_{selection} = \begin{cases} n+(L-M)-T_{proc,0}, L-M>0 \\ n-T_{proc,0}, L-M \le 0 \end{cases},$$

where $n_{selection}$ denotes a resource selection occasion; n denotes an arrival time of a packet; L denotes a duration of short-term contiguous sensing required to be performed before resource selection; M denotes a first duration, and M≥0; and $T_{proc,0}$ denotes a duration for processing a sensing result obtained within the duration of short-term contiguous sensing required to be performed before resource selection.

Further, the determining the resource selection occasion based on the duration of short-term contiguous sensing required to be performed before resource selection includes:

determining the resource selection occasion according to one of the following formulas:

$$n_{selection} = n + L;$$

$$n_{selection} = n + L + T_{proc,0}; \text{and}$$

$$n_{selection} = n + L - T_{proc,0},$$

where $n_{selection}$ denotes a resource selection occasion; n denotes an arrival time of a packet; L denotes a duration of short-term contiguous sensing required to be performed before resource selection; and $T_{proc,0}$ denotes a duration for processing a sensing result obtained within the duration of short-term contiguous sensing required to be performed before resource selection.

Optionally, an ending time of the short-term contiguous sensing is the resource selection occasion.

Specifically, the contiguous sensing includes at least one of the following:

sensing performed when discontinuous reception is on;

periodic partial sensing; and short-term contiguous sensing triggered by transmission of another packet.

Optionally, after the determining a resource selection occasion, the method further includes:

determining a resource selection window based on the resource selection occasion.

Further, the resource selection window is $[n_{selection}+T_1, n_{selection}+T_2]$, where $T_1$ denotes a parameter for determining a starting time of a resource selection window; $T_2$ denotes a parameter for determining an ending time of the resource selection window, and at least one of the following is satisfied:

$T_2-T_1$ is greater than or equal to a minimum candidate time domain resource quantity for resource selection window;

$T_2$ is less than or equal to a maximum time domain resource quantity between two transmissions and capable of being indicated in a time domain resource allocation field in sidelink control information; and $T_2$ is less than or equal to a preset value.

Specifically, the minimum candidate time domain resource quantity for resource selection window is determined in at least one of the following manners:

being determined based on a parameter for minimum candidate time domain resource quantity for resource selection window;

being determined based on a parameter for minimum candidate time domain resource quantity corresponding to each transmission;

being determined based on a priority of the packet;

being determined based on a delay of the packet;

being determined based on reliability of the packet; and being determined based on quality of service of the packet.

Optionally, after the selecting, at the resource selection occasion, a transmission resource for transmitting the packet, the method further includes:

continuing to perform contiguous sensing, and after first processing is performed on the transmission resource, preforming transmission of the packet, where the first processing includes a re-evaluation mechanism and/or a pre-emption mechanism.

Further, a manner of determining an ending time of a resource selection window for the first processing includes one of the following:

the ending time of the resource selection window for the first processing is determined as an absolute time of an ending time of a resource selection window used when an initial resource selection is performed for the packet;

the ending time of the resource selection window for the first processing is determined as a time corresponding to a first preset duration set after an initial resource selection occasion is performed for the packet; and a time corresponding to the ending time of the resource selection window for the first processing is earlier than or equal to a time corresponding to a sum of a starting time of the contiguous sensing and a maximum preset duration of short-term contiguous sensing.

Optionally, an ending time of the contiguous sensing is: an ending time of the first processing.

An embodiment of the present disclosure further provides a terminal, including a processor, a memory, and a computer program stored on the memory and capable of running on the processor. When the computer program is executed by the processor, steps of the foregoing resource selection method for sidelink are implemented.

An embodiment of the present disclosure further provides a terminal, including:

a determining module, configured to determine a resource selection occasion when a packet arrives; and a selection module, configured to select, at the resource selection occasion, a transmission resource for transmitting the packet.

An embodiment of the present disclosure further provides processor-readable storage medium, where the processor-readable storage medium stores a computer program, and the computer program is used to make a processor perform steps of the foregoing resource selection method for sidelink.

A beneficial effect of the present disclosure is as follows:

in the foregoing solution, when a packet arrives, a resource selection occasion is determined, and then resource selection is performed according to the determined resource selection occasion, thereby ensuring transmission reliability of the packet.

BRIEF DESCRIPTION OF THE DRAWINGS

FIG. 9 is a schematic diagram 3 of a location of an ending time of a resource selection window in a re-evaluation mechanism.

FIG. 10 is a schematic diagram of modules of a terminal according to an embodiment of the present disclosure.

FIG. 11 is a structural diagram of a terminal according to an embodiment of the present disclosure.

DETAILED DESCRIPTION OF THE EMBODIMENTS

To make the objectives, technical solutions, and advantages of the present disclosure clearer, the following describes the present disclosure in detail with reference to the accompanying drawings and specific embodiments.

In the present disclosure, for a V2X terminal in a power saving mechanism, when a dynamic packet arrives, there is no implementation mechanism for how the terminal performs resource selection in a related technology, and transmission reliability of the dynamic packet cannot be ensured. In view of this problem, a resource selection method for sidelink in vehicle-to-everything and a terminal are provided.

Figure 1:
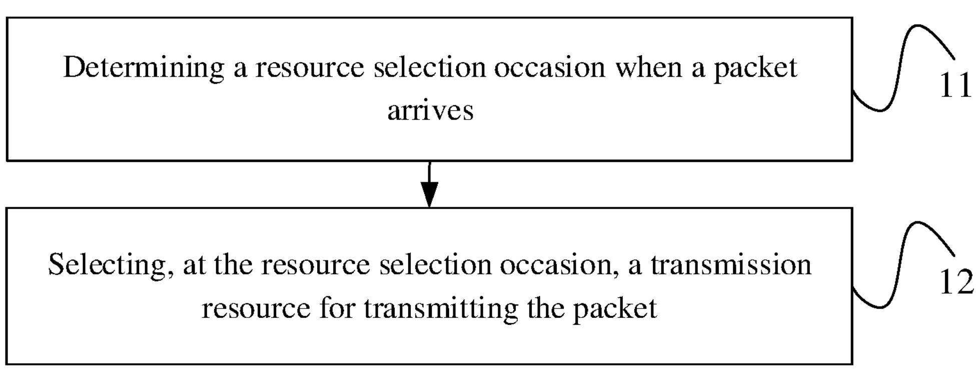
FIG. 1 is a schematic flowchart of a resource selection method for sidelink according to an embodiment of the present disclosure.

As shown in FIG. 1, a resource selection method for sidelink in an embodiment of the present disclosure is applied to a terminal and includes the following steps.

Step 11: Determining a resource selection occasion when a packet arrives.

It should be noted that the packet may correspond to different specific descriptions used for different layers, and may be specifically described as, including but not limited to, a packet, a transport block (TB), a media access control protocol data unit (MAC PDU), data (DATA), or a data packet.

A specific case in which the MAC PDU is used as an example is as follows: when a MAC entity selects to create a selected sidelink grant for transmission (one or more times) of a single MAC PDU, the technical solution of the present disclosure is used.

Step 12: Selecting, at the resource selection occasion, a transmission resource for transmitting the packet.

It should be noted that when the packet arrives, the resource selection occasion is determined, and then resource selection is performed according to the determined resource selection occasion, thereby ensuring transmission reliability of the packet.

It should be noted that the resource selection in this embodiment of the present disclosure mainly refers to resource selection for a terminal on sidelink in a V2X communication process. Further, the resource selection method is mainly applied to a terminal that can implement a power saving mechanism. That is to say, in a case that the terminal works in a power saving mechanism, when a packet arrives, the terminal first determines a resource selection occasion, and then selects, at the resource selection occasion, a transmission resource for transmitting the packet. In this way, transmission reliability of the packet can be ensured.

Specific implementation processes of the present disclosure are described below in detail.

Optionally, in another embodiment of the present application, an implementation of Step 11 is as follows.

Step a: Obtaining a first target parameter corresponding to the packet.

It should be noted that the first target parameter includes a parameter for minimum short-term contiguous sensing duration or a parameter for short-term contiguous sensing duration. Further, the parameter for minimum short-term contiguous sensing duration or the parameter for short-term contiguous sensing duration may be agreed upon by a protocol, configured on a network side, or pre-configured.

Step b: If a value of the first target parameter is zero, determining that the resource selection occasion is an arrival time of the packet.

It should be noted that, in this case, if the terminal obtains that a value of the parameter for minimum short-term contiguous sensing duration or a value of the parameter for short-term contiguous sensing duration is zero, it indicates that the terminal may perform resource selection without needing to perform sensing.

Further, it should be noted that the parameter for minimum short-term contiguous sensing duration in this embodiment may be a single parameter independently configured. For example, a system configures the parameter for minimum short-term contiguous sensing duration as a fixed value. Alternatively, the parameter for minimum short-term contiguous sensing duration is correspondingly configured with a plurality of parameter values depending on different values of at least one of a priority, a delay, reliability, and quality of service of a packet, that is, in this case, the parameter for minimum short-term contiguous sensing duration is a parameter list, and a parameter for minimum short-term contiguous sensing duration currently to be used needs to be determined based on a packet to be transmitted.

For example, when the parameter for minimum short-term contiguous sensing duration is determined based on the priority of the packet, for the highest priority (higher than a preset priority threshold or a priority threshold configured on a network side), sensing is not performed and resource selection is performed directly (and then sensing+re-evaluation and/or pre-emption are performed); for another priority, sensing is performed. Specifically, a correspondence between a priority and a parameter for minimum short-term contiguous sensing duration is shown in Table 1.

TABLE 1

Correspondence between priority and parameter for minimum short-term contiguous sensing duration

| Priority value | Parameter for minimum short-term contiguous sensing duration | Notes |
|---|---|---|
| 0 | 0 | Indicating the highest priority, where other terminals need to perform avoidance, and sensing is not required to be performed. |

TABLE 1-continued

Correspondence between priority and parameter for minimum short-term contiguous sensing duration

| Priority value | Parameter for minimum short-term contiguous sensing duration | Notes |
|---|---|---|
| 1 | 32 logical slots | |
| 2 | 32 logical slots | |
| 3 | 32 logical slots | |
| 4 | 32 logical slots | |
| 5 | 32 logical slots | |
| 6 | 32 logical slots | |
| 7 | 32 logical slots | |

For example, when the parameter for minimum short-term contiguous sensing duration is determined based on the delay of the packet, and when a delay requirement is lower than a preset threshold or a threshold configured on a network side, sensing is not performed or shorter sensing is performed. In another case, sensing is performed or longer sensing is performed. Specifically, correspondences between a delay of a packet (specifically referred to as a packet delay budget (PDB)) and a parameter for minimum short-term contiguous sensing duration are shown in Table 2 to Table 4.

TABLE 2

First correspondence between PDB and parameter for minimum short-term contiguous sensing duration

| PDB | Parameter for minimum short-term contiguous sensing duration | Notes |
|---|---|---|
| PDB ≤ 10 ms | 0 | When a delay requirement is high, sensing (sensing) is not required to be performed. |
| 10 ms < PDB < 20 ms | Logical slots corresponding to a range of 0.5 × PDB | When a delay requirement is relatively high, sensing is performed according to half of the PDB, and then a transmission resource is selected. |
| PDB ≥ 20 ms | 32 Logical slots | |

TABLE 3

Second correspondence between PDB and parameter for minimum short-term contiguous sensing duration

| PDB | Parameter for minimum short-term contiguous sensing duration | Notes |
|---|---|---|
| PDB ≤ 20 ms | 0 | When a delay requirement is high, sensing is not required to be performed. |
| PDB > 20 ms | 32 Logical slots | |

TABLE 4

Third correspondence between PDB and parameter for minimum short-term contiguous sensing duration

| PDB | Parameter for minimum short-term contiguous sensing duration | Notes |
|---|---|---|
| PDB ≤ 20 ms | Logical slots corresponding to a range of 0.5 × PDB | When a delay requirement is relatively high, sensing is performed according to half of the PDB, and then a transmission resource is selected. |
| PDB > 20 ms | 32 Logical slots | |

Further, it should be noted that the parameter for short-term contiguous sensing duration in this embodiment may be a single parameter independently configured. For example, a system configures the parameter for short-term contiguous sensing duration as a fixed value. Alternatively, the parameter for short-term contiguous sensing duration is correspondingly configured with a plurality of parameter values depending on different values of at least one of a priority, a delay, reliability, and quality of service of a packet, that is, in this case, the parameter for short-term contiguous sensing duration is a parameter list. For example, the list indicates parameters for short-term contiguous sensing duration corresponding to priorities of different packets. In other words, in this case, a parameter for short-term contiguous sensing duration currently to be used needs to be determined based on a packet to be transmitted.

Optionally, in another embodiment of the present application, another implementation of Step 11 is as follows.

Step c: Obtaining a first target parameter corresponding to the packet.

Specifically, the first target parameter includes a parameter for minimum short-term contiguous sensing duration or a parameter for short-term contiguous sensing duration. It should be noted that, further, the parameter for minimum short-term contiguous sensing duration or the parameter for short-term contiguous sensing duration may be agreed upon by a protocol, configured on a network side, or pre-configured. Specifically, the parameter for minimum short-term contiguous sensing duration may be a single parameter independently configured. For example, a system configures the parameter for minimum short-term contiguous sensing duration as a fixed value. Alternatively, the parameter for minimum short-term contiguous sensing duration is correspondingly configured with a plurality of parameter values depending on different values of at least one of a priority, a delay, reliability, and quality of service of a packet. When a duration of short-term contiguous sensing required to be performed before resource selection is determined based on the parameter for minimum short-term contiguous sensing duration, the duration of the short-term contiguous sensing required to be performed before resource selection needs to be greater than or equal to a corresponding parameter value. The parameter for short-term contiguous sensing duration may be a single parameter independently configured. For example, the system configures the parameter for short-term contiguous sensing duration as a fixed value. Alternatively, the parameter for short-term contiguous sensing duration is correspondingly configured with a plurality of parameter values depending on different values of at least one of a priority, a delay, reliability, and quality of service of a packet.

Step d: If the terminal performs contiguous sensing before an arrival time of the packet, and a duration of the contiguous sensing is greater than or equal to the first target parameter, determining that the resource selection occasion is equal to the arrival time of the packet.

It should be noted herein that, if the terminal has performed the contiguous sensing before the packet arrives, and the duration of the contiguous sensing is greater than or equal to the parameter for minimum short-term contiguous sensing duration or the parameter for short-term contiguous sensing duration, it indicates that a sensing result obtained through the previous contiguous sensing can meet a requirement that the terminal performs resource selection. In this case, the terminal may directly perform the resource selection at the arrival time of the packet.

Further, it should be noted that, to ensure that the sensing result of the contiguous sensing obtained before the packet arrives can be accurately applied to a resource selection of the packet to be sent this time, the contiguous sensing should meet that: the contiguous sensing ends before the arrival time of the packet, and a duration between the arrival time of the packet and a time at which sensing stops is less than or equal to K, where K is an integer greater than or equal to 0.

Further, it should be noted that the contiguous sensing mentioned in this embodiment includes at least one of the following:

A11. sensing performed when discontinuous reception is on;

A12. periodic partial sensing; and

A13. short-term contiguous sensing triggered by transmission of another packet.

Further, it should be noted that the another packet refers to another packet generated aperiodically and different from the current packet to be sent.

Optionally, in yet another embodiment of the present application, another implementation of Step 11 is as follows.

Step e: Determining a duration of short-term contiguous sensing required to be performed before resource selection.

It should be noted that the duration of the short-term contiguous sensing should be an integer greater than or equal to 0, and its unit may be millisecond (ms) or a time domain resource granularity (for example, a logical slot/logical subframe or a physical slot/physical subframe).

Step f: Determining the resource selection occasion based on the duration of short-term contiguous sensing required to be performed before resource selection.

It should be noted that, in this implementation, when the packet arrives, the duration of short-term contiguous sensing required to be performed before resource selection is first determined, and then the resource selection occasion is determined based on the determined duration of short-term contiguous sensing. In this way, it can be ensured that the terminal has already obtained a sufficient sensing result before resource selection, so that accuracy of the resource selection can be ensured.

Specifically, a further implementation of Step e is as follows:

determining, based on a second target parameter, the duration of short-term contiguous sensing required to be performed before resource selection.

Specifically, the second target parameter includes at least one of the following.

B11. A priority of the packet.

For example, to ensure accuracy of resource selection, the higher the priority of the packet, the longer the duration of the short-term contiguous sensing. Alternatively, the higher the priority of the packet, the higher a probability of avoidance of another terminal, and the shorter the duration of the short-term contiguous sensing.

B12. A delay of the packet.

For example, the lower the delay of the packet, the shorter the duration of the short-term contiguous sensing.

B13. Reliability of the packet.

For example, the higher the reliability of the packet, the longer the duration of the short-term contiguous sensing.

B14. Quality of service (QoS) of the packet.

For example, the higher the quality of service of the packet, the longer the duration of the short-term contiguous sensing.

B15. A parameter for minimum short-term contiguous sensing duration.

It should be noted that the parameter for minimum short-term contiguous sensing duration may be agreed upon by a protocol, configured on a network side, or pre-configured. When the duration of short-term contiguous sensing required to be performed before resource selection is determined based on the parameter for minimum short-term contiguous sensing duration, the duration of the short-term contiguous sensing required to be performed before resource selection needs to be greater than or equal to a corresponding parameter value.

B16. A parameter for short-term contiguous sensing duration.

It should be noted that the parameter for short-term contiguous sensing duration may be agreed upon by a protocol, configured on a network side, or pre-configured.

It should be noted that a setting manner of the parameter for minimum short-term contiguous sensing duration and the parameter for short-term contiguous sensing duration in this embodiment is the same as the setting manner in the foregoing embodiment, and details are not described herein again.

It should be further noted that, optionally, in another embodiment of the present application, an implementation of Step f is:

if the terminal performs contiguous sensing before an arrival time of the packet, and a duration of the contiguous sensing is greater than or equal to the duration of short-term contiguous sensing required to be performed before resource selection, determining that the resource selection occasion is equal to the arrival time of the packet.

It should be noted herein that, if the terminal has performed the contiguous sensing before the packet arrives, and the duration of the contiguous sensing is greater than or equal to the duration of short-term contiguous sensing required to be performed, it indicates that a sensing result obtained through the previous contiguous sensing can meet a requirement that the terminal performs resource selection. In this case, the terminal may directly perform the resource selection at the arrival time of the packet.

Further, it should be noted that, to ensure that the sensing result of the contiguous sensing obtained before the packet arrives can be accurately applied to a resource selection of the packet to be sent this time, the contiguous sensing should meet that: the contiguous sensing ends before the arrival time of the packet, and a duration between the arrival time of the packet and a time at which sensing stops is less than or equal to K, where K is an integer greater than or equal to 0.

Figure 2:
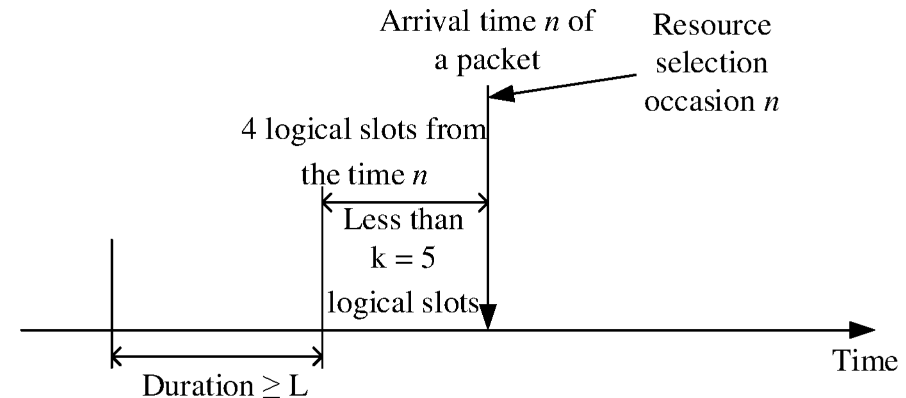
FIG. 2 is a schematic diagram of a location of a resource selection occasion determined in a first manner.

For example, as shown in FIG. 2, a sensing duration of a terminal for a periodic service, discontinuous reception on (DRX on), or another non-periodic service is greater than or equal to a duration (L) of short-term contiguous sensing required to be performed, and a duration (4 logical slots) before that sensing stops is less than K=5 logical slots. In this case, the resource selection occasion is an arrival time n of the packet.

It should be further noted that, optionally, in another embodiment of the present application, another implementation of Step f is:

determining a first duration of contiguous sensing being performed by the terminal at an arrival time of the packet; and determining the resource selection occasion based on the first duration and the duration of short-term contiguous sensing required to be performed before resource selection.

It should be further noted that, the determining the resource selection occasion based on the first duration and the duration of short-term contiguous sensing required to be performed before resource selection includes:

determining the resource selection occasion according to one of the following formulas:

$$n_{selection}\begin{cases} n+(L-M), & L-M>0 \\ n, & L-M\le 0 \end{cases}; \quad \text{Formula 1}$$

$$n_{selection}\begin{cases} n+(L-M)+T_{proc,0}, & L-M>0 \\ n+T_{proc,0}, & L-M\le 0 \end{cases}; \text{ and} \quad \text{Formula 2}$$

$$n_{selection}\begin{cases} n+(L-M)-T_{proc,0}, & L-M>0 \\ n-T_{proc,0}, & L-M\le 0 \end{cases}, \quad \text{Formula 3}$$

where $n_{selection}$ denotes a resource selection occasion; n denotes an arrival time of a packet; L denotes a duration of short-term contiguous sensing required to be performed before resource selection; M denotes a first duration, where M≥0; and $T_{proc,0}$ denotes a duration for processing a sensing result obtained within the duration of short-term contiguous sensing required to be performed before resource selection.

Further, it should be noted that in this embodiment, an ending time of the short-term contiguous sensing is the resource selection occasion.

The contiguous sensing mentioned in this embodiment includes at least one of the foregoing A11 to A13.

Figure 3:
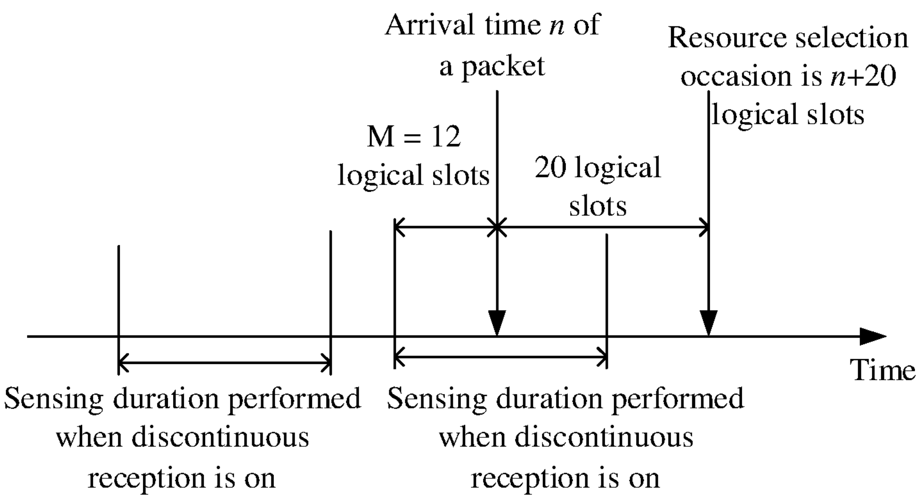
FIG. 3 is a schematic diagram of a location of a resource selection occasion determined in a second manner.
Figure 4:
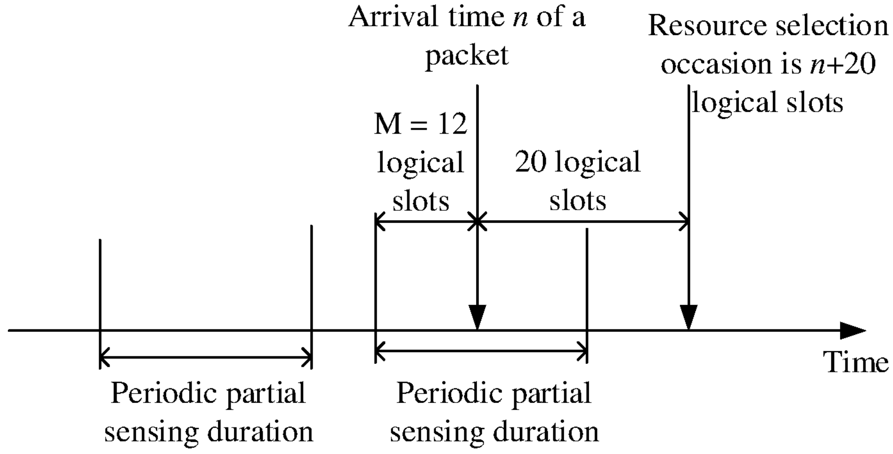
FIG. 4 is a schematic diagram of a location of a resource selection occasion determined in a third manner.
Figure 5:
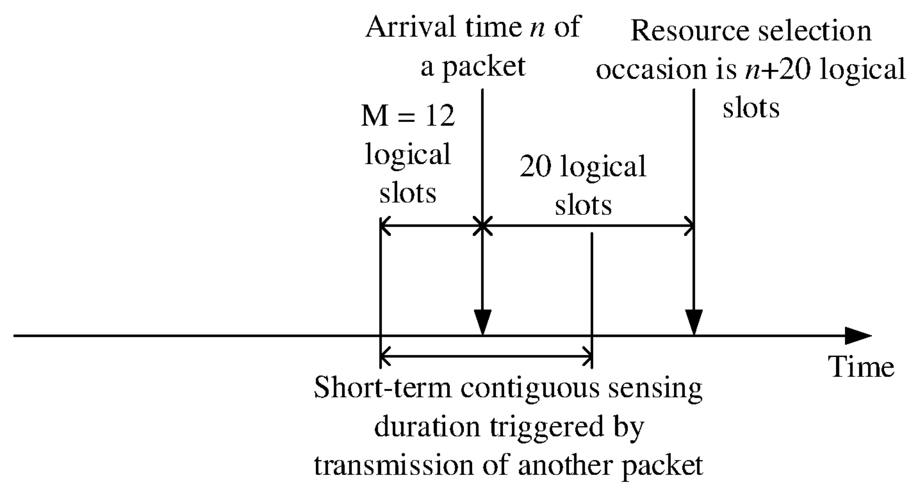
FIG. 5 is a schematic diagram of a location of a resource selection occasion determined in a fourth manner.

For example, that the duration of short-term contiguous sensing required to be performed is 32 logical slots is used as an example. When the contiguous sensing includes sensing that is performed when discontinuous reception is on, a schematic diagram for determining the resource selection occasion by using the first duration and the duration of short-term contiguous sensing is shown in FIG. 3. In this case, the resource selection occasion is n+20 logical slots. When the contiguous sensing includes periodic partial sensing, a schematic diagram for determining the resource selection occasion by using the first duration and the duration of short-term contiguous sensing is shown in FIG. 4. In this case, the resource selection occasion is n+20 logical slots. When the contiguous sensing includes short-term contiguous sensing triggered by transmission of another packet, a schematic diagram for determining the resource selection occasion by using the first duration and the duration of short-term contiguous sensing is shown in FIG. 5. In this case, the resource selection occasion is n+20 logical slots.

It should be noted that, in this case, it is considered that whether contiguous sensing is being performed by the terminal at the arrival time of the packet. If the contiguous sensing is being performed by the terminal, a first duration in which the contiguous sensing has been performed is obtained, and then the resource selection occasion is determined and obtained based on the duration. In this case, sensing that has already been performed can be fully used, sensing time of the terminal can be reduced, power consumption of the terminal can be reduced, and transmission efficiency of the packet also can be improved.

It should be further noted that, optionally, in another embodiment of the present application, another implementation of Step f is:

determining the resource selection occasion according to one of the following formulas:

$$n_{selection}=n+L; \quad \text{Formula 4}$$

$$n_{selection}=n+L+T_{proc,0}; \text{ and} \quad \text{Formula 5}$$

$$n_{selection}=n+L-T_{proc,0}, \quad \text{Formula 6}$$

where $n_{selection}$ denotes a resource selection occasion; n denotes an arrival time of a packet; L denotes a duration of short-term contiguous sensing required to be performed before resource selection; and $T_{proc,0}$ denotes a duration for processing a sensing result obtained within the duration of short-term contiguous sensing required to be performed before resource selection.

It should be noted that, in this case, it is not considered whether contiguous sensing is being performed by the terminal at the arrival time of the packet. As long as a packet arrives, sensing needs to be performed for the packet again, so that accuracy of sensing can be ensured, and further accuracy of resource selection can be ensured.

Further, in this embodiment, an ending time of the short-term contiguous sensing is the resource selection occasion.

Further, it should be noted that, on the basis of the foregoing embodiments, after the determining a resource selection occasion, the method further includes:

determining a resource selection window based on the resource selection occasion.

Specifically, the resource selection window is $[n_{selection}+T_1, n_{selection}+T_2]$.

With reference to Formulas 1 to 6, the resource selection window may be represented as one of the following:

$$\begin{cases} [n+(L-M)+T_1,\ n+(L-M)+T_2]_2 L-M>0 \\ [n+T_1,\ n+T_2],\ L-M\le 0 \end{cases}; \quad \text{S11.}$$

$$\begin{cases} [n+(L-M)+T_{proc,0}+T_1,\ n+(L-M)+T_{proc,0}+T_2],\ L-M>0 \\ [n+T_{proc,0}+T_1,\ n+T_{proc,0}+T_2],\ L-M\le 0 \end{cases}; \quad \text{S12.}$$

$$\begin{cases} [n+(L-M)-T_{proc,0}+T_1,\ n-(L-M)-T_{proc,0}+T_2],\ L-M>0 \\ [n-T_{proc,0}+T_1,\ n-T_{proc,0}+T_2],\ L-M\le 0 \end{cases}; \quad \text{S13.}$$

$$[n+L+T_1,\ n+L+T_2]; \quad \text{S14.}$$

$$[n+L+T_{proc,0}+T_1,\ n+L+T_{proc,0}+T_2]; \text{ and} \quad \text{S15.}$$

$$[n+L-T_{proc,0}+T_1,\ n+L-T_{proc,0}+T_2], \quad \text{S16.}$$

where $T_1$ denotes a parameter for determining a starting time of a resource selection window; $T_2$ denotes a parameter for determining an ending time of the resource selection window, and at least one of the following is satisfied:

M11. $T_2-T_1$ is greater than or equal to a minimum candidate time domain resource quantity for resource selection window.

M12. $T_2$ is less than or equal to a maximum time domain resource quantity between two transmissions and capable of being indicated in a time domain resource allocation field in sidelink control information.

For example, a maximum time domain resource quantity between two adjacent transmissions in a same packet/TB and capable of being indicated in a time domain resource allocation field in a sidelink control information format 1A (SCI Format 1A) defined in 3rd generation partnership project release 16 (3GPP Release 16) is 32 logical slots. If $T_2$ exceeds this quantity, according to the sidelink control information format 1A (SCI Format 1A) defined in 3GPP Release 16, a candidate resource exceeding 32 logical slots will not have any corresponding available sensing result. If the candidate resource is selected as a transmission resource, reliability is reduced, which is a specific technical problem caused by insufficient sensing results in a power saving mechanism.

M13. $T_2$ is less than or equal to a preset value.

Specifically, the preset value may be agreed upon by a protocol, configured on a network side, or pre-configured.

Figure 6:
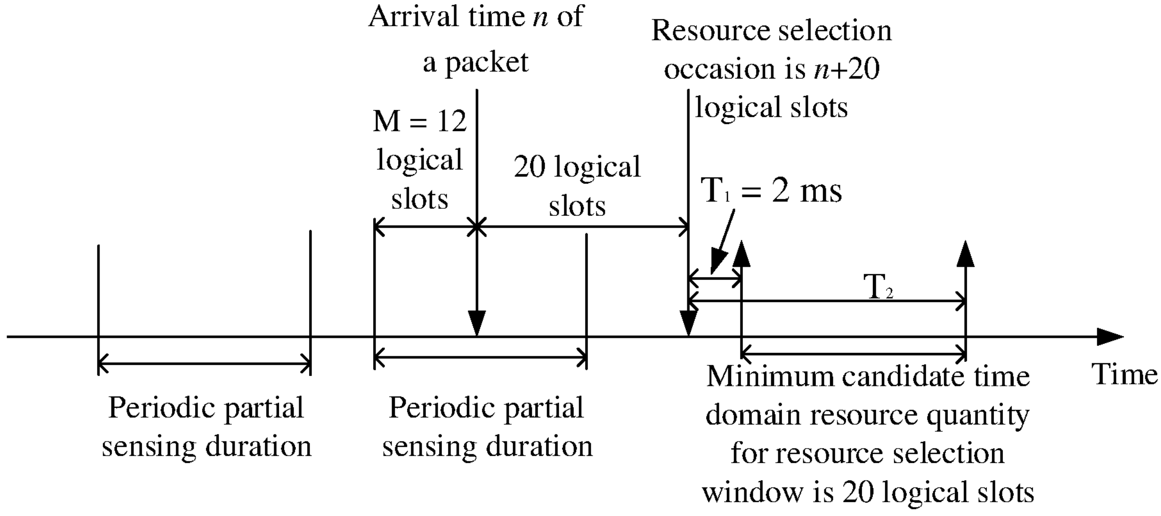
FIG. 6 is a schematic diagram of a location of a resource selection window.

For example, as shown in FIG. 6, a subcarrier spacing (SCS) of a current bandwidth part (BWP) is 30 KHz, and $T_1$=2 ms, that is, $T_1$ is equal to 4 logical slots. That $T_2-T_1$ is equal to a minimum candidate time domain resource quantity for resource selection window (20 logical slots herein) is used as an example. In this case, the resource selection window is [n+20 logical slots+4 logical slots, n+20 logical slots+4 logical slots+20 logical slots].

It should be noted that, the minimum candidate time domain resource quantity for resource selection window may be agreed upon by a protocol, configured on a network side, or pre-configured.

Further, the minimum candidate time domain resource quantity for resource selection window is determined in at least one of the following manners.

C11. Being determined based on a parameter for minimum candidate time domain resource quantity for resource selection window.

It should be noted that the parameter for minimum candidate time domain resource quantity for resource selection window may be agreed upon by a protocol, configured on a network side, or pre-configured. Further, the parameter for minimum candidate time domain resource quantity for resource selection window may be a single parameter independently configured, or may be a plurality of parameter values correspondingly configured depending on different values of at least one of a priority, a delay, reliability, and quality of service of the packet. That is, in this case, the minimum candidate time domain resource quantity for resource selection window is a parameter list. For example, the list indicates minimum candidate time domain resource quantities for resource selection window corresponding to priorities of different packets. In other words, in this case, a minimum candidate time domain resource quantity for resource selection window currently to be used needs to be determined based on a packet to be transmitted.

C12. Being determined based on a parameter for minimum candidate time domain resource quantity corresponding to each transmission.

It should be noted that the parameter for minimum candidate time domain resource quantity corresponding to each transmission may be agreed upon by a protocol, configured on a network side, or pre-configured. Further, the parameter for minimum candidate time domain resource quantity corresponding to each transmission may be a single parameter configured independently, or may be a plurality of parameter values correspondingly configured depending on different values of at least one of a priority, a delay, reliability, and quality of service of the packet. That is, in this case, the parameter for minimum candidate time domain resource quantity corresponding to each transmission is a parameter list, and a minimum candidate time domain resource quantity for resource selection window currently to be used needs to be determined based on a packet to be transmitted. Specifically, the minimum candidate time domain resource quantity for resource selection window should not be less than a value obtained by multiplying the parameter for minimum candidate time domain resource quantity corresponding to each transmission by a quantity of transmission times of the packet. For example, each packet is transmitted twice, and the parameter for minimum candidate time domain resource quantity corresponding to each transmission is 10 ms. In this case, the minimum candidate time domain resource quantity for resource selection window should be no less than 20 ms (namely, greater than or equal to 20 ms).

C13. Being determined based on a priority of the packet.

C14. Being determined based on a delay of the packet.

C15. Being determined based on reliability of the packet.

C16. Being determined based on quality of service of the packet.

Further, on the basis of any one of the foregoing embodiments, in another embodiment of the present application, after Step 11, the method further includes:

continuing to perform contiguous sensing, and after first processing is performed on the transmission resource, performing transmission of the packet.

The first processing includes a re-evaluation (Re-evaluation) mechanism and/or a pre-emption (Pre-emption) mechanism.

It should be noted that the re-evaluation mechanism described in this embodiment of the present disclosure means performing, at least at a time $T_3$ ($T_3$=$T_1$) before a resource, re-evaluation judgment on the resource that has been selected but has not been indicated and reserved by sidelink control information (SCI), to determine whether the resource is available; and if not, performing re-selection. In the embodiment of the present disclosure, the re-evaluation mechanism may further be an improved re-evaluation mechanism, which refers to performing, at least at a time $T_3$ ($T_3$=$T_1$) before a resource, re-evaluation judgment on the resource that has been selected and no matter whether the resource has been indicated and reserved by sidelink control information (SCI), to determine whether the resource is available; and if not, performing re-selection.

The pre-emption mechanism means performing, at least at a time $T_3$ ($T_3$=$T_1$) before a resource, pre-emption judgment on a resource that has been selected and has been indicated and reserved by sidelink control information (SCI), to determine whether the resource is preempted to transmit a packet with a higher priority, or preempted to transmit a packet with a higher priority that is higher than a triggering threshold of a configured pre-emption mechanism; and reselection is performed if the resource is preempted.

Further, it should be noted that a manner of determining an ending time of a resource selection window for the first processing includes one of the following:

D11. The ending time of the resource selection window for the first processing is determined as an absolute time of an ending time of a resource selection window used when an initial resource selection is performed for the packet.

Figures 7, 8:
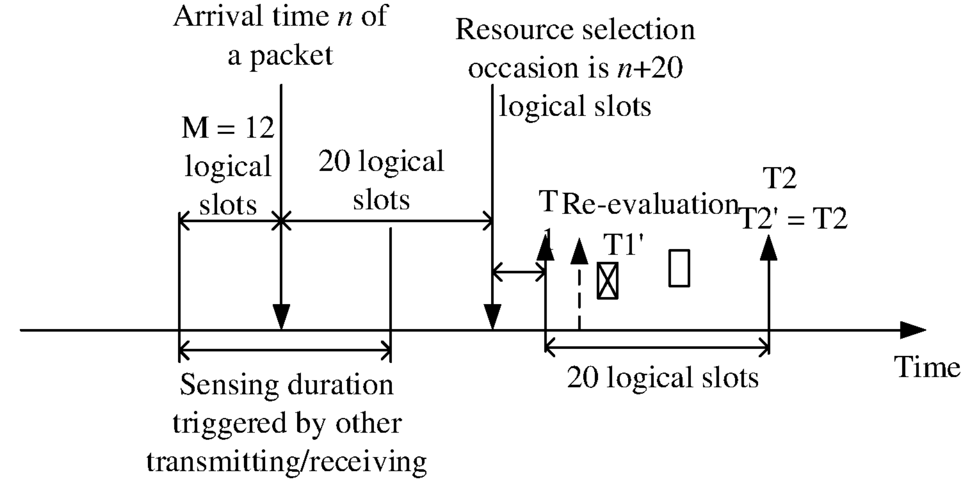
FIG. 7 is a schematic diagram 1 of a location of an ending time of a resource selection window in a re-evaluation mechanism.
FIG. 8 is a schematic diagram 2 of a location of an ending time of a resource selection window in a re-evaluation mechanism.

Using the re-evaluation mechanism as an example, as shown in FIG. 7, an ending time of a resource selection window determined by the re-evaluation mechanism is resource selection occasion $n+T_{2'}$ ($T_{2'}=T_2$, where $T_2$ is a parameter for determining the ending time of the resource selection window when initial resource selection is performed).

D12. The ending time of the resource selection window for the first processing is determined as a time corresponding to a first preset duration set after an initial resource selection occasion is performed for the packet.

It should be noted that the first preset duration may be agreed upon by a protocol, configured on a network side, or preconfigured, and a unit of the first preset duration may be ms or time domain resource (for example, logical slot).

Using the re-evaluation mechanism as an example, as shown in FIG. 8, a first preset duration P is 50 logical slots, and therefore, an ending time of a resource selection window determined by the re-evaluation mechanism is not later than 50 logical slots following resource selection occasion n+20 logical slots.

D13. A time corresponding to the ending time of the resource selection window for the first processing is earlier than or equal to a time corresponding to a sum of a starting time of the contiguous sensing and a maximum preset duration of short-term contiguous sensing.

Using the re-evaluation mechanism as an example, as shown in FIG. 9, the maximum preset duration of short-term contiguous sensing is 60 logical slots, and therefore, an ending time of a resource selection window determined by the re-evaluation mechanism is not later than 28 (namely, 60-12-20) logical slots following resource selection occasion n+20 logical slots.

D14. An ending time of a resource selection window for the first processing is consistent with an ending time of a resource selection window of a first processing determined by an existing mechanism.

In other words, in this case, a length of the resource selection window for the first processing remains unchanged, and the ending time of the resource selection window for the first processing is moved forward directly.

Further, it should be noted that in a case that the first processing is introduced, an ending time of the contiguous sensing is:

an ending time of the first processing.

In conclusion, the present disclosure can achieve the following beneficial effects.

1. When a packet arrives, a V2X terminal operating in a power saving mechanism can determine a necessary sensing duration before resource selection, thereby reducing a probability of collision with service transmission of another terminal, and avoiding significant reduction in reliability.

2. A V2X terminal operating in a power saving mechanism can determine a resource selection occasion based on other sensing triggered by transmitting/receiving (including partial sensing triggered by a periodic service, sensing triggered by discontinuous reception, sensing triggered by another packet, and the like) of the terminal and a determined necessary sensing duration before resource selection. On the one hand, a problem that an existing mechanism cannot be applicable is resolved. On the other hand, a result of sensing being performed when a packet arrives or a result of proximity sensing before a packet arrives can be used as far as possible, to achieve maximum power saving in the case of ensuring reliability.

3. A V2X device operating in a power saving mechanism can determine a resource selection window corresponding to arrival of a packet and a resource selection window of re-evaluation/pre-emption, so that both power saving performance and collision avoidance performance can be ensured.

It should be noted that the resource selection method for sidelink described in the present disclosure is mainly applied to resource selection in vehicle-to-everything, but is not limited to the vehicle-to-everything. For example, resource selection in a cellular network also falls within the protection scope of the present disclosure.

As shown in FIG. 10, an embodiment of the present disclosure further provides a terminal 100, including:

a determining module 101, configured to determine a resource selection occasion when a packet arrives; and a selection module 102, configured to select, at the resource selection occasion, a transmission resource for transmitting the packet.

Optionally, the determining module 101 includes:

a first obtaining unit, configured to obtain a first target parameter corresponding to the packet; and a first determining unit, configured to: if a value of the first target parameter is zero, determine that the resource selection occasion is an arrival time of the packet.

The first target parameter includes a parameter for minimum short-term contiguous sensing duration or a parameter for short-term contiguous sensing duration.

Optionally, the determining module 101 includes:

a second obtaining unit, configured to obtain a first target parameter corresponding to the packet; and a second determining unit, configured to: if the terminal performs contiguous sensing before an arrival time of the packet, and a duration of the contiguous sensing is greater than or equal to the first target parameter, determine that the resource selection occasion is equal to the arrival time of the packet.

The first target parameter includes a parameter for minimum short-term contiguous sensing duration or a parameter for short-term contiguous sensing duration.

Optionally, the determining module 101 includes:

a third determining unit, configured to determine a duration of a short-term contiguous sensing that needs to be performed before resource selection; and a fourth determining unit, configured to determine the resource selection occasion based on the duration of the short-term contiguous sensing required to be performed before resource selection.

Further, the third determining unit is configured to:

determine, based on a second target parameter, the duration of short-term contiguous sensing required to be performed before resource selection.

The second target parameter includes at least one of the following:

a priority of the packet;

a delay of the packet;

reliability of the packet;

quality of service of the packet;

a parameter for minimum short-term contiguous sensing duration; and a parameter for short-term contiguous sensing duration.

Further, the fourth determining unit is configured to:

if the terminal performs contiguous sensing before an arrival time of the packet, and a duration of the contiguous sensing is greater than or equal to the duration of short-term contiguous sensing required to be performed before resource selection, determine that the resource selection occasion is equal to the arrival time of the packet.

Further, the contiguous sensing ends before the arrival time of the packet, and a duration between the arrival time of the packet and a time at which sensing stops is less than or equal to K, where K is an integer greater than or equal to 0.

Further, the fourth determining unit is configured to:

determine a first duration of contiguous sensing being performed by the terminal at an arrival time of the packet; and determine the resource selection occasion based on the first duration and the duration of short-term contiguous sensing required to be performed before resource selection.

Specifically, a manner of determining the resource selection occasion based on the first duration and the duration of short-term contiguous sensing required to be performed before resource selection is as follows:

determining the resource selection occasion according to one of the following formulas:

$$n_{selection}\begin{cases} n+(L-M), & L-M>0 \\ n, & L-M\le 0 \end{cases};$$

$$n_{selection}\begin{cases} n+(L-M)+T_{proc,0}, & L-M>0 \\ n+T_{proc,0}, & L-M\le 0 \end{cases}; \text{ and}$$

$$n_{selection}\begin{cases} n+(L-M)-T_{proc,0}, & L-M>0 \\ n-T_{proc,0}, & L-M\le 0 \end{cases},$$

where $n_{selection}$ denotes a resource selection occasion; n denotes an arrival time of a packet; L denotes a duration of short-term contiguous sensing required to be performed before resource selection; M denotes a first duration, and M≥0; and $T_{proc,0}$ denotes a duration for processing a sensing result obtained within the duration of short-term contiguous sensing required to be performed before resource selection.

Further, the fourth determining unit is configured to:

determine the resource selection occasion according to one of the following formulas:

$$n_{selection}=n+L;$$

$$n_{selection}=n+L+T_{proc,0}; \text{ and}$$

$$n_{selection}=n+L-T_{proc,0},$$

where $n_{selection}$ denotes a resource selection occasion; n denotes an arrival time of a packet; L denotes a duration of short-term contiguous sensing required to be performed before resource selection; and $T_{proc,0}$ denotes a duration for processing a sensing result obtained within the duration of short-term contiguous sensing required to be performed before resource selection.

Optionally, an ending time of the short-term contiguous sensing is the resource selection occasion.

Specifically, the contiguous sensing includes at least one of the following:

sensing performed when discontinuous reception is on;

periodic partial sensing; and short-term contiguous sensing triggered by transmission of another packet.

Optionally, the determining module further includes:

a window determining module, configured to determine a resource selection window based on the resource selection occasion after the resource selection occasion is determined.

Further, the resource selection window is $[n_{selection}+T_1, n_{selection}+T_2]$.

$T_1$ denotes a parameter for determining a starting time of a resource selection window; $T_2$ denotes a parameter for determining an ending time of the resource selection window, and at least one of the following is satisfied:

$T_2-T_1$ is greater than or equal to a minimum candidate time domain resource quantity for resource selection window;

$T_2$ is less than or equal to a maximum time domain resource quantity between two transmissions and capable of being indicated in a time domain resource allocation field in sidelink control information; and $T_2$ is less than or equal to a preset value.

Specifically, the minimum candidate time domain resource quantity for resource selection window is determined in at least one of the following manners:

being determined based on a parameter for minimum candidate time domain resource quantity for resource selection window;

being determined based on a parameter for minimum candidate time domain resource quantity corresponding to each transmission;

being determined based on a priority of the packet;

being determined based on a delay of the packet;

being determined based on reliability of the packet; and being determined based on quality of service of the packet.

Optionally, the terminal further includes:

a processing module, configured to continue to perform contiguous sensing after selecting, by the selection module, a transmission resource for transmitting the packet at the resource selection occasion, and perform transmission of the packet after first processing is performed on the transmission resource.

The first processing includes a re-evaluation mechanism and/or a pre-emption mechanism.

Further, a manner of determining an ending time of a resource selection window for the first processing includes one of the following:

the ending time of the resource selection window for the first processing is determined as an absolute time of an ending time of a resource selection window used when an initial resource selection is performed for the packet;

the ending time of the resource selection window for the first processing is determined as a time corresponding to a first preset duration set after an initial resource selection occasion is performed for the packet; and a time corresponding to the ending time of the resource selection window for the first processing is earlier than or equal to a time corresponding to a sum of a starting time of the contiguous sensing and a maximum preset duration of short-term contiguous sensing.

Specifically, an ending time of the contiguous sensing is: an ending time of the first processing.

It should be noted that the terminal embodiment is in a one-to-one corresponding with the foregoing method embodiment. All implementations in the foregoing method embodiment are applicable to the terminal embodiment, and can also achieve a same technical effect.

As shown in FIG. 11, an embodiment of the present disclosure further provides a terminal 110, including a processor 111, a transceiver 112, a memory 113, and a program stored in the memory 113 and capable of running on the processor 111. The transceiver 112 is connected to the processor 111 and the memory 113 by using a bus interface. The processor 111 is configured to read a program in the memory and perform the following process:

determining a resource selection occasion when a packet arrives; and selecting, at the resource selection occasion, a transmission resource for transmitting the packet.

It should be noted that, in FIG. 11, a bus architecture may include any quantity of interconnected buses and bridges, and specifically interconnect various circuits of one or more processors represented by the processor 111 and a memory represented by the memory 113. The bus architecture may further interconnect various other circuits such as a peripheral device, a voltage regulator, and a power management circuit. These are all well known in the art, and therefore are not further described in this specification. The bus interface provides an interface. The transceiver 112 may be a plurality of components, including a transmitter and a receiver, and provides units for communicating with a variety of other apparatuses on a transmission medium. For different terminals, a user interface 114 may also be an interface capable of externally or internally connecting a required device, and the connected device includes, but is not limited to, a keypad, a display, a speaker, a microphone, a joystick, and the like. The processor 111 is responsible for management of the bus architecture and general processing, and the memory 113 may store data for use by the processor 111 when the processor 111 performs an operation.

Optionally, the processor 111 is configured to read a program in the memory, and further perform the following process:

obtaining a first target parameter corresponding to the packet; and if a value of the first target parameter is zero, determining that the resource selection occasion is an arrival time of the packet.

The first target parameter includes a parameter for minimum short-term contiguous sensing duration or a parameter for short-term contiguous sensing duration.

Optionally, the processor 111 is configured to read a program in the memory, and further perform the following process:

obtaining a first target parameter corresponding to the packet; and if the terminal performs contiguous sensing before an arrival time of the packet, and a duration of the contiguous sensing is greater than or equal to the first target parameter, determining that the resource selection occasion is equal to the arrival time of the packet.

The first target parameter includes a parameter for minimum short-term contiguous sensing duration or a parameter for short-term contiguous sensing duration.

Optionally, the processor 111 is configured to read a program in the memory, and further perform the following process:

determining a duration of short-term contiguous sensing required to be performed before resource selection; and determining the resource selection occasion based on the duration of short-term contiguous sensing required to be performed before resource selection.

Optionally, the processor 111 is configured to read a program in the memory, and further perform the following process:

determining, based on a second target parameter, the duration of short-term contiguous sensing required to be performed before resource selection.

The second target parameter includes at least one of the following:

a priority of the packet;

a delay of the packet;

reliability of the packet;

quality of service of the packet;

a parameter for minimum short-term contiguous sensing duration; and a parameter for short-term contiguous sensing duration.

Optionally, the processor 111 is configured to read a program in the memory, and further perform the following process:

if the terminal performs contiguous sensing before an arrival time of the packet, and a duration of the contiguous sensing is greater than or equal to the duration of short-term contiguous sensing required to be performed before resource selection, determining that the resource selection occasion is equal to the arrival time of the packet.

Specifically, the contiguous sensing ends before the arrival time of the packet, and a duration between the arrival time of the packet and a time at which sensing stops is less than or equal to K, where K is an integer greater than or equal to 0.

Optionally, the processor 111 is configured to read a program in the memory, and further perform the following process:

determining a first duration of contiguous sensing being performed by the terminal at an arrival time of the packet; and determining the resource selection occasion based on the first duration and the duration of short-term contiguous sensing required to be performed before resource selection.

Optionally, the processor 111 is configured to read a program in the memory, and further perform the following process:

determining the resource selection occasion according to one of the following formulas:

$$n_{selection}\begin{cases} n+(L-M), & L-M>0 \\ n, & L-M\le 0 \end{cases};$$

$$n_{selection}\begin{cases} n+(L-M)+T_{proc,0}, & L-M>0 \\ n+T_{proc,0}, & L-M\le 0 \end{cases}; \text{and}$$

$$n_{selection}\begin{cases} n+(L-M)-T_{proc,0}, & L-M>0 \\ n-T_{proc,0}, & L-M\le 0 \end{cases},$$

where $n_{selection}$ denotes a resource selection occasion; n denotes an arrival time of a packet; L denotes a duration of short-term contiguous sensing required to be performed before resource selection; M denotes a first duration, and M≥0; and $T_{proc,0}$ denotes a duration for processing a sensing result obtained within the duration of short-term contiguous sensing required to be performed before resource selection.

Optionally, the processor 111 is configured to read a program in the memory, and further perform the following process:

determining the resource selection occasion according to one of the following formulas:

$$n_{selection} = n + L;$$

$$n_{selection} = n + L + T_{proc,0}; \text{ and}$$

$$n_{selection} = n + L - T_{proc,0},$$

where $n_{selection}$ denotes a resource selection occasion; n denotes an arrival time of a packet; L denotes a duration of short-term contiguous sensing required to be performed before resource selection; and $T_{proc,0}$ denotes a duration for processing a sensing result obtained within the duration of short-term contiguous sensing required to be performed before resource selection.

Specifically, an ending time of the short-term contiguous sensing is resource selection occasion.

Specifically, the contiguous sensing includes at least one of the following:

sensing performed when discontinuous reception is on;

periodic partial sensing; and short-term contiguous sensing triggered by transmission of another packet.

Optionally, the processor 111 is configured to read a program in the memory, and further perform the following process:

determining a resource selection window based on the resource selection occasion.

Specifically, the resource selection window is $[n_{selection}+T_1, n_{selection}+T_2]$.

$T_1$ denotes a parameter for determining a starting time of a resource selection window; $T_2$ denotes a parameter for determining an ending time of the resource selection window, and at least one of the following is satisfied:

$T_2-T_1$ is greater than or equal to a minimum candidate time domain resource quantity for resource selection window;

$T_2$ is less than or equal to a maximum time domain resource quantity between two transmissions and capable of being indicated in a time domain resource allocation field in sidelink control information; and $T_2$ is less than or equal to a preset value.

Specifically, the minimum candidate time domain resource quantity for resource selection window is determined in at least one of the following manners:

being determined based on a parameter for minimum candidate time domain resource quantity for resource selection window;

being determined based on a parameter for minimum candidate time domain resource quantity corresponding to each transmission;

being determined based on a priority of the packet;

being determined based on a delay of the packet;

being determined based on reliability of the packet; and being determined based on quality of service of the packet.

Optionally, the processor 111 is configured to read a program in the memory, and further perform the following process:

continuing to perform contiguous sensing, and after first processing is performed on the transmission resource, performing transmission of the packet.

The first processing includes a re-evaluation mechanism and/or a pre-emption mechanism.

Specifically, a manner of determining an ending time of a resource selection window for the first processing includes one of the following:

the ending time of the resource selection window for the first processing is determined as an absolute time of an ending time of a resource selection window used when an initial resource selection is performed for the packet;

the ending time of the resource selection window for the first processing is determined as a time corresponding to a first preset duration set after an initial resource selection occasion is performed for the packet; and a time corresponding to the ending time of the resource selection window for the first processing is earlier than or equal to a time corresponding to a sum of a starting time of the contiguous sensing and a maximum preset duration of short-term contiguous sensing.

Specifically, an ending time of the contiguous sensing is: an ending time of the first processing.

An embodiment of the present disclosure further provides a readable storage medium, and the readable storage medium stores a computer program. When the program is executed by a processor, the steps of resource selection method for sidelink applied to a terminal are implemented.

An embodiment of the present disclosure further provides a chip, and the chip includes a processor and a communications interface. The communications interface is coupled to the processor, and the processor is configured to run a program or instructions to implement processes of the foregoing resource selection method embodiments for sidelink, and a same technical effect can be achieved. To avoid repetition, details are not described herein again.

It should be understood that the chip mentioned in this embodiment of the present application may also be referred to as a system-level chip, a system chip, a chip system, a system-on-chip, or the like.

It should be noted that in this specification, the term "comprise", "include", or any other variant thereof is intended to cover a non-exclusive inclusion, so that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude the existence of other identical elements in the process, method, article, or apparatus that includes the element. In addition, it should be noted that the scope of the method and apparatus in the embodiments of the present application is not limited to performing functions in a sequence shown or discussed, and may also include performing functions in a substantially simultaneous manner or in a reverse sequence according to related functions. For example, the described method may be performed in a different order, and various steps may be added, omitted, or combined. In addition, features described with reference to some examples may be combined in other examples.

According to the description of the foregoing implementations, a person skilled in the art may clearly understand that the methods in the foregoing embodiments may be implemented by software in addition to a necessary universal hardware platform or by hardware only. In most cases, the former is a more preferred implementation. Based on such an understanding, the technical solutions of the present application essentially, or the part contributing to the related technologies may be implemented in a form of a software product. The computer software product is stored in a storage medium (for example, a ROM/RAM, a magnetic disk, or an optical disc), and includes a plurality of instructions for instructing a terminal (which may be a mobile phone, a computer, a server, an air conditioner, a network device, or the like) to perform the methods described in the embodiments of the present application.

It should be noted that the foregoing module division is merely a logical function division. In actual implementation, all or a part of the modules may be integrated into a physical entity, or may be physically separated. In addition, these modules may be implemented in a form of software invoked by a processing element; or may be all implemented in a form of hardware; or some modules may be implemented in a form of software invoked by a processing element, and some modules may be implemented in a form of hardware. For example, a determining module may be a separately disposed processing element, or may be integrated into a chip of the foregoing apparatus for implementation. In addition, the determining module may be stored in a memory of the foregoing apparatus in a form of program code, and a processing element of the foregoing apparatus invokes the program code and executes a function of the determining module. An implementation of another module is similar. In addition, all or a part of the modules may be integrated together, or may be independently implemented. The processing element herein may be an integrated circuit having a signal processing capability. In an implementation process, the steps in the foregoing methods or the foregoing modules may be completed by an integrated logic circuit of hardware in the processor element or instructions in a form of software.

For example, modules, units, subunits, or submodules may be configured to implement one or more integrated circuits in the foregoing methods, for example, one or more application specific integrated circuits (ASIC), or one or more digital signal processors (DSP), or one or more field programmable gate arrays (FPGA), or the like. For another example, when a module is implemented in the form of program code being scheduled by a processing element, the processing element may be a general-purpose processor, for example, a central processing unit (CPU) or another processor capable of invoking the program code. For another example, these modules may be integrated together and implemented in a form of a system-on-a-chip (SOC).

The terms “first”, “second” and the like in this specification and claims of the present disclosure are used to distinguish between similar objects, rather than to describe a particular order or a sequential order. It should be understood that the data used in this way may be interchangeable under appropriate circumstances such that embodiments of the present disclosure described herein are implemented, for example, in an order different from that illustrated or described herein. In addition, the terms “include” and “have” and any other variants thereof are intended to cover the non-exclusive inclusion. For example, a process, method, system, product, or device that includes a series of steps or units is not necessarily limited to those expressly listed steps or units, but may include other steps or units not expressly listed or inherent to such process, method, product, or device. In addition, in the specification and claims, “and/or” is used to indicate at least one of connected objects. For example, A and/or B and/or C represents the following seven cases: Only A is included, only B is included, only C is included, both A and B exist, both B and C exist, both A and C exist, and A, B and C all exist. Similarly, “at least one of A and B” used in the specification and claims should be understood as “Only A is included, only B is included, or both A and B exist”.

The foregoing descriptions are merely the preferred implementations of the present disclosure. It should only be noted that those of ordinary skill in the art may further make various improvements and modifications without departing from the principles of the present disclosure, and these improvements and modifications also fall within the protection scope of the present disclosure.

What is claimed is:

1. A resource selection method for sidelink, applied to a terminal, comprising:

determining a resource selection occasion when a packet arrives; and selecting, at the resource selection occasion, a transmission resource for transmitting the packet;

wherein the determining a resource selection occasion comprises:

determining a duration of short-term contiguous sensing required to be performed before resource selection; and determining the resource selection occasion based on the duration of short-term contiguous sensing required to be performed before resource selection;

wherein the determining a duration of short-term contiguous sensing required to be performed before resource selection comprises:

determining, based on a second target parameter, the duration of short-term contiguous sensing required to be performed before resource selection;

wherein the second target parameter is agreed upon by a protocol, configured on a network side or pre-configured, the second target parameter comprises at least one of the following:

a parameter for minimum short-term contiguous sensing duration; and a parameter for short-term contiguous sensing duration.

2. The method according to claim 1, wherein the determining a resource selection occasion comprises:

obtaining a first target parameter corresponding to the packet; and if a value of the first target parameter is zero, determining that the resource selection occasion is an arrival time of the packet, wherein the first target parameter comprises a parameter for minimum short-term contiguous sensing duration or a parameter for short-term contiguous sensing duration.

3. The method according to claim 1, wherein the determining a resource selection occasion comprises:

obtaining a first target parameter corresponding to the packet; and if the terminal performs contiguous sensing before an arrival time of the packet, and a duration of the contiguous sensing is greater than or equal to the first target parameter, determining that the resource selection occasion is equal to the arrival time of the packet, wherein the first target parameter comprises a parameter for minimum short-term contiguous sensing duration or a parameter for short-term contiguous sensing duration.

4. The method according to claim 1, wherein the determining the resource selection occasion based on the duration of short-term contiguous sensing required to be performed before resource selection comprises:

if the terminal performs contiguous sensing before an arrival time of the packet, and a duration of the contiguous sensing is greater than or equal to the duration of short-term contiguous sensing required to be performed before resource selection, determining that the resource selection occasion is equal to the arrival time of the packet.

5. The method according to claim 4, wherein the contiguous sensing ends before the arrival time of the packet, and a duration between the arrival time of the packet and a time at which sensing stops is less than or equal to K, wherein K is an integer greater than or equal to 0.

6. The method according to claim 1, wherein the determining the resource selection occasion based on the duration of short-term contiguous sensing required to be performed before resource selection comprises:

determining a first duration of contiguous sensing being performed by the terminal at an arrival time of the packet; and determining the resource selection occasion based on the first duration and the duration of short-term contiguous sensing required to be performed before resource selection.

7. The method according to claim 6, wherein the determining the resource selection occasion based on the first duration and the duration of short-term contiguous sensing required to be performed before resource selection comprises:

determining the resource selection occasion according to one of the following formulas:

$$n_{selection}\begin{cases} n+(L-M),\ L-M>0 \\ n,\ L-M\le 0 \end{cases};$$

$$n_{selection}\begin{cases} n+(L-M)+T_{proc,0},\ L-M>0 \\ n+T_{proc,0},\ L-M\le 0 \end{cases};\text{ and}$$

$$n_{selection}\begin{cases} n+(L-M)-T_{proc,0},\ L-M>0 \\ n-T_{proc,0},\ L-M\le 0 \end{cases},$$

wherein $n_{selection}$ denotes a resource selection occasion; n denotes an arrival time of a packet; L denotes a duration of short-term contiguous sensing required to be performed before resource selection; M denotes a first duration, wherein M≥0; and $T_{proc,0}$ denotes a duration for processing a sensing result obtained within the duration of short-term contiguous sensing required to be performed before resource selection.

8. The method according to claim 1, wherein the determining the resource selection occasion based on the duration of short-term contiguous sensing required to be performed before resource selection comprises:

determining the resource selection occasion according to one of the following formulas:

$$n_{selection}=n+L;$$

$$n_{selection}=n+L+T_{proc,0};\text{ and}$$

$$n_{selection}=n+L-T_{proc,0},$$

wherein $n_{selection}$ denotes a resource selection occasion; n denotes an arrival time of a packet; L denotes a duration of short-term contiguous sensing required to be performed before resource selection; and $T_{proc,0}$ denotes a duration for processing a sensing result obtained within the duration of short-term contiguous sensing required to be performed before resource selection.

9. The method according to claim 1, wherein an ending time of the short-term contiguous sensing is the resource selection occasion.

10. The method according to claim 1, wherein after the determining a resource selection occasion, the method further comprises:

determining a resource selection window based on the resource selection occasion.

11. The method according to claim 10, wherein the resource selection window is $[n_{selection}+T_1,\ n_{selection}+T_2]$, wherein $T_1$ denotes a parameter for determining a starting time of a resource selection window; $T_2$ denotes a parameter for determining an ending time of the resource selection window, and at least one of the following is satisfied:

$T_2-T_1$ is greater than or equal to a minimum candidate time domain resource quantity for resource selection window;

$T_2$ is less than or equal to a maximum time domain resource quantity between two transmissions and capable of being indicated in a time domain resource allocation field in sidelink control information; and $T_2$ is less than or equal to a preset value.

12. The method according to claim 11, wherein the minimum candidate time domain resource quantity for resource selection window is determined in at least one of the following manners:

being determined based on a parameter for minimum candidate time domain resource quantity for resource selection window;

being determined based on a parameter for minimum candidate time domain resource quantity corresponding to each transmission;

being determined based on a priority of the packet;

being determined based on a delay of the packet;

being determined based on reliability of the packet; and being determined based on quality of service of the packet.

13. The method according to claim 1, wherein after the selecting, at the resource selection occasion, a transmission resource for transmitting the packet, the method further comprises:

continuing to perform contiguous sensing, and after first processing is performed on the transmission resource, performing transmission of the packet, wherein the first processing comprises a re-evaluation mechanism and/or a pre-emption mechanism.

14. The method according to claim 13, wherein a manner of determining an ending time of a resource selection window for the first processing comprises one of the following:

the ending time of the resource selection window for the first processing is determined as an absolute time of an ending time of a resource selection window used when an initial resource selection is performed for the packet;

the ending time of the resource selection window for the first processing is determined as a time corresponding to a first preset duration set after an initial resource selection occasion is performed for the packet; and a time corresponding to the ending time of the resource selection window for the first processing is earlier than or equal to a time corresponding to a sum of a starting time of the contiguous sensing and a maximum preset duration of short-term contiguous sensing.

15. The method according to claim 13, wherein an ending time of the contiguous sensing is:

an ending time of the first processing.

16. A terminal, comprising a processor, a memory, and a computer program stored on the memory and capable of running on the processor, wherein when the computer program is executed by the processor, steps of the resource selection method for sidelink according to claim 1 are implemented.

17. A non-transitory processor-readable storage medium, wherein the non-transitory processor-readable storage medium stores a computer program, and the computer program is used to make a processor perform steps of the resource selection method for sidelink according to claim 1.

18. A chip, comprising a processor and a communications interface, wherein the communications interface is coupled to the processor, and the processor is configured to run a program to implement the resource selection method for sidelink according to claim 1.

* * * * *